(12) United States Patent
Hätönen et al.

(10) Patent No.: US 11,895,003 B2
(45) Date of Patent: Feb. 6, 2024

(54) MANAGING QUALITY OF MONITORING MODELS FOR COLLECTION OF PERFORMANCE AND/OR SENSING DATA

(71) Applicant: NOKIA SOLUTIONS AND NETWORKS OY, Espoo (FI)

(72) Inventors: Kimmo Hätönen, Helsinki (FI); Sasu Tarkoma, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/014,096

(22) PCT Filed: Jul. 3, 2020

(86) PCT No.: PCT/EP2020/068769
§ 371 (c)(1),
(2) Date: Dec. 30, 2022

(87) PCT Pub. No.: WO2022/002411
PCT Pub. Date: Jan. 6, 2022

(65) Prior Publication Data
US 2023/0308380 A1    Sep. 28, 2023

(51) Int. Cl.
*G06F 15/173*    (2006.01)
*H04L 43/50*    (2022.01)

(52) U.S. Cl.
CPC .................................... *H04L 43/50* (2013.01)

(58) Field of Classification Search
CPC ....................................................... H04L 43/50
USPC ........................................................ 709/224
See application file for complete search history.

(56) References Cited

U.S. PATENT DOCUMENTS

2009/0257361 A1* 10/2009 Deshpande ............. H04L 43/50
370/332
2012/0197852 A1   8/2012 Dutta et al.
2014/0047106 A1   2/2014 Leung et al.
(Continued)

FOREIGN PATENT DOCUMENTS

EP    3 457 634 A1    3/2019
FI    3457634    *    3/2019    ............. H04L 12/26

OTHER PUBLICATIONS

International Search Report and Written Opinion dated Mar. 24, 2021 corresponding to International Patent Application No. PCT/EP2020/068769.

*Primary Examiner* — Alan S Chou
(74) *Attorney, Agent, or Firm* — Robert P. Michal, Esq.; Carter, DeLuca & Farrell LLP

(57) ABSTRACT

Devices, methods and computer program products for managing quality of monitoring models for collection of performance and/or sensing data are disclosed. A communication network node device sets up a quality of monitoring function for managing a quality of monitoring, QoM, model that defines QoM classes for processing and compressing a performance and/or sensing data stream via selection of data to be included in the performance and/or sensing data stream. The communication network node device causes a first message notifying about the set up QMF to be transmitted towards at least one first target rendezvous point, RP, in the communication network, each RP being configured to aggregate at least one of performance and/or sensing data streams or QoM models.

11 Claims, 7 Drawing Sheets

(56) References Cited

U.S. PATENT DOCUMENTS

| | | |
|---|---|---|
| 2015/0113132 A1* | 4/2015 | Srinivas ............... H04L 41/147 |
| | | 709/224 |
| 2015/0146603 A1 | 5/2015 | Wu et al. |
| 2017/0207996 A1* | 7/2017 | Lui .................... H04L 43/0829 |
| 2019/0215694 A1 | 7/2019 | Rubin et al. |
| 2020/0344299 A1* | 10/2020 | Sohail .................... G06F 3/067 |
| 2021/0274369 A1* | 9/2021 | Wu .................... H04L 43/0888 |
| 2022/0286876 A1* | 9/2022 | Van Phan ............. H04W 24/10 |

* cited by examiner

MANAGING QUALITY OF MONITORING MODELS FOR COLLECTION OF PERFORMANCE AND/OR SENSING DATA

TECHNICAL FIELD

The disclosure relates generally to communication networks and, more particularly but not exclusively, to supporting collection of data in communication networks.

BACKGROUND

In many communication networks, managed devices obtain performance data and provide the performance data to one or more management entities as management plane performance data. As the number of managed devices increases, there will be several data consumers subscribing for multiple partially overlapping management plane performance data streams with multiple sources and contents, and thus there may be a need for solutions that organize and combine these partially overlapping data streams to serve artificial intelligence and/or machine learning applications of various network functions and user services.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a communication network node device of a communication network comprises at least one processor and at least one memory including computer program code. The at least one memory and the computer program code are configured to, with the at least one processor, cause the communication network node device to at least perform:

setting up a quality of monitoring function, QMF, for managing at least one quality of monitoring, QoM, model, the at least one QoM model defining QoM classes for processing and compressing a performance and/or sensing data stream via selection of data to be included in the performance and/or sensing data stream, the performance and/or sensing data stream comprising performance measurement results based on sensor data provided by one or more sensor nodes in the communication network; and causing a first message notifying about the set up QMF to be transmitted towards at least one first target rendezvous point, RP, in the communication network, each RP being configured to aggregate at least one of performance and/or sensing data streams or QoM models.

In an example embodiment, alternatively or in addition to the above-described example embodiments, the set up QMF is configured to publish at least one of sensor data or a local QoM model.

In an example embodiment, alternatively or in addition to the above-described example embodiments, the set up QMF is configured to subscribe a global QoM model.

In an example embodiment, alternatively or in addition to the above-described example embodiments, the first target RP is a designated RP.

In an example embodiment, alternatively or in addition to the above-described example embodiments, the set up QMF is transmitted towards the at least one designated RP via at least one transient RP.

In an example embodiment, alternatively or in addition to the above-described example embodiments, the set up QMF is transmitted towards the at least one first target RP via a mobility protocol.

In an example embodiment, alternatively or in addition to the above-described example embodiments, the at least one memory and the computer program code are further configured to, with the at least one processor, cause the communication network node device to at least perform:

receiving a first completion token from the at least one first target RP indicating a successful receipt and processing of the first message.

In an example embodiment, alternatively or in addition to the above-described example embodiments, the at least one memory and the computer program code are further configured to, with the at least one processor, cause the communication network node device to at least perform:

in response to the communication network node device being relocated in the communication network, causing a second message notifying about the set up QMF to be transmitted towards at least one second target RP in the communication network.

In an example embodiment, alternatively or in addition to the above-described example embodiments, the communication network node device comprises one of a sensor node configured to provide sensor data, a network element configured to obtain performance and/or sensing data based on the provided sensor data, or a management element configured to receive the obtained performance and/or sensing data.

In an example embodiment, alternatively or in addition to the above-described example embodiments, the performance and/or sensing data stream comprises a management plane performance data stream.

An example embodiment of a communication network node device comprises means for performing:

setting up a quality of monitoring function, QMF, for managing at least one quality of monitoring, QoM, model, the at least one QoM model defining QoM classes for processing and compressing a performance and/or sensing data stream via selection of data to be included in the performance and/or sensing data stream, the performance and/or sensing data stream comprising performance measurement results based on sensor data provided by one or more sensor nodes in the communication network; and causing a first message notifying about the set up QMF to be transmitted towards at least one first target rendezvous point, RP, in the communication network, each RP being configured to aggregate at least one of performance and/or sensing data streams or QoM models.

An example embodiment of a method comprises:

setting up, by a communication network node device of a communication network, a quality of monitoring function, QMF, for managing at least one quality of monitoring, QoM, model, the at least one QoM model defining QoM classes for processing and compressing a performance and/or sensing data stream via selection of data to be included in the performance and/or sensing data stream, the performance and/or sensing data stream comprising performance measurement results based on sensor data provided by one or more sensor nodes in the communication network; and causing, by the communication network node device, a first message notifying about the set up QMF to be transmitted towards at least one first target rendezvous point, RP, in the communication network, each RP being configured to aggregate at least one of performance and/or sensing data streams or QoM models.

In an example embodiment, alternatively or in addition to the above-described example embodiments, the set up QMF is configured to publish at least one of sensor data or a local QoM model.

In an example embodiment, alternatively or in addition to the above-described example embodiments, the set up QMF is configured to subscribe a global QoM model.

In an example embodiment, alternatively or in addition to the above-described example embodiments, the first target RP is a designated RP.

In an example embodiment, alternatively or in addition to the above-described example embodiments, the set up QMF is transmitted towards the at least one designated RP via at least one transient RP.

In an example embodiment, alternatively or in addition to the above-described example embodiments, the set up QMF is transmitted towards the at least one first target RP via a mobility protocol.

In an example embodiment, alternatively or in addition to the above-described example embodiments, the method further comprises receiving, by the communication network node device, a first completion token from the at least one first target RP indicating a successful receipt and processing of the first message.

In an example embodiment, alternatively or in addition to the above-described example embodiments, the method further comprises, in response to the communication network node device being relocated in the communication network, causing, by the communication network node device, a second message notifying about the set up QMF to be transmitted towards at least one second target RP in the communication network.

In an example embodiment, alternatively or in addition to the above-described example embodiments, the communication network node device comprises one of a sensor node configured to provide sensor data, a network element configured to obtain performance data and/or sensing based on the provided sensor data, or a management element configured to receive the obtained performance and/or sensing data.

In an example embodiment, alternatively or in addition to the above-described example embodiments, the performance and/or sensing data stream comprises a management plane performance data stream.

An example embodiment of a computer program product comprises program code configured to perform the method according to any of the above example embodiments, when the computer program product is executed on a computer.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
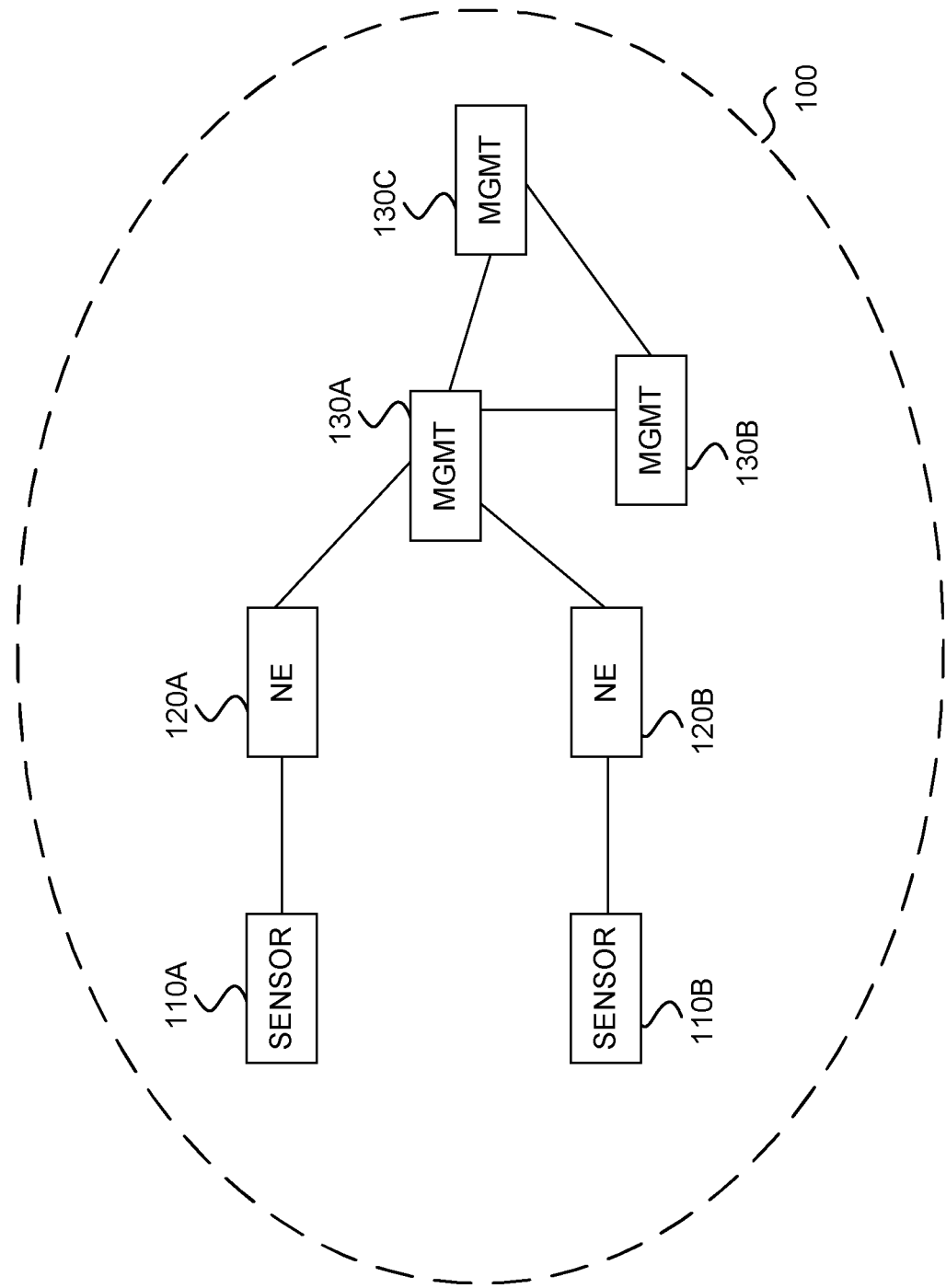
FIG. 1 shows an example embodiment of the subject matter described herein illustrating an example communication network, where various example embodiments of the present disclosure may be implemented.

FIG. 1 illustrates an example communication network 100, where various embodiments of the present disclosure may be implemented. The communication network 100 may comprise a fifth generation (5G) new radio (NR) network. An example representation of the communication network 100 is shown depicting sensor nodes 110A, 110B, network elements (NE) 120A, 120B, and management elements (MGMT) 130A, 130B, 130C.

At least some of the network elements 120A, 120B may comprise e.g. a base station, a controller, or a node implementing a network function (NF).

At least some of the managements elements 130A, 130B, 130C may comprise e.g. a network management system (NMS) that may be arranged to help cellular operators to manage, operate, plan and configure their network services and network elements.

At least some of the sensor nodes 110A, 110B, may be configured to provide sensor data, such as position, acceleration, temperature, or the like. In at least some example embodiments, at least some of the sensor nodes 110A, 110B may be internet-of-things (IoT) devices.

At least some of the network elements 120A, 120B may be configured to obtain management plane (M-Plane) performance data based on the provided sensor data. In other words, at least some of the network elements 120A, 120B may be configured to generate (e.g. periodically) performance measurement results (i.e. performance metrics) based on the sensor data received from the sensor nodes 110A, 110B. These generated performance metrics may be included M-Plane data, thereby forming M-Plane performance data. For example, the M-Plane performance data may include performance indicators, which may be in the form of measurement data, counters, key performance indicators (KPIs), or the like, as well as various combinations thereof. In at least some example embodiments, at least some of the network elements 120A, 120B may be further configured to obtain some of the M-Plane performance data based on performance data produced by one or more of the network elements 120A, 120B themselves, e.g., produced by counting different events or measuring physical quantities such as transmission power, or the like. The M-Plane performance data may be forwarded to at least some of the management elements 130A, 130B, 130C to be utilized in various ways (e.g. in performing management functions). For example, an NMS may use the M-Plane performance data to determine the state of the network elements 120A, 120B.

In at least some example embodiments, at least some of the management elements 130A, 130B, 130C may comprise an artificial intelligence (AI) application and/or a machine learning (ML) application. Furthermore, in at least some example embodiments, at least some of the network elements 120A, 120B may comprise an AI layer. At least some of the AI applications and/or AI layers may function as rendezvous points (RP) in at least some example embodiments, as will be discussed in more detail below. Furthermore, in at least some example embodiments, at least some of the AI applications in the management elements 130A, 130B, 130C may function as consumers of the M-Plane performance data.

In the example embodiments, quality of monitoring, QoM, models are utilized for compressing data streams, such as the stream of M-Plane performance data from the sensor nodes 110A, 110B onwards. QoM models define QoM classes that specify a quality by which M-Plane performance data may be collected. In other words, in QoM class based data compression, the meaningful (or more meaningful) data is selected by a sender and provided from the sender to a receiver while the meaningless (or less meaningful) data is not selected by the sender and, as such, is not provided by the sender to the receiver. In this manner, the M-Plane performance data may be compressed into compressed M-Plane performance data. Thus, herein QoM models are used for compressing data streams.

In addition to QoM models, at least one quality of monitoring function, QMF, is utilized in the example embodiments to manage (e.g. modify or adjust) at least one of the QoM models.

There may be situations in which very large amounts of data consumers subscribe for multiple partially overlapping data streams with multiple sources and contents. An example of such a situation may rise when edge and/or fog computing environments are increasingly used for execution of AI applications, ML applications, analytics applications, and/or other data hungry applications. QMF allows organizing and combining these optimized (with QoM models) partially overlapping multiple data streams to serve AI and/or ML applications of various network functions and user services. In other words, at least some example embodiments allow learning and/or adjusting these QoM models that separate significant data points from insignificant ones, using, e.g., machine learning and data analysis approaches.

QMF may optimize QoM classes/models through advanced aggregation, distribution and/or bundling operations, as will be discussed in more detail below.

At least some example embodiments may utilize quality of monitoring policies (QoM), functions for learning and processing (QMF), and transient and designated (fixed) rendezvous points (RP) in the network for data/model aggregation. The QMF system may publish and subscribe data with quality of monitoring (QoM) specifications. At least some example embodiments may accommodate learning related QMFs that propagate data and learned models toward the rendezvous points for the creation of the global model. The global model and its update may be distributed to the subscribing nodes.

At least some example embodiments allow taking the QoM and QMF close to the sensor. Thus, it is possible to implement the mechanism in a sensor system. In addition, QoM can be implemented using QMF, and QMF optimizes QoM through, e.g., advanced aggregation, distribution and bundling operations.

At least some example embodiments comprise AI processes that subscribe to receive data items. Each subscription may have an associated QoM and QMF specifications that detail the data needed for the learning process and aspects of the learning and data processing that can be distributed.

Thus, in at least some example embodiments the system is able to reduce unnecessary details from the data while catering to the needs of the AI applications.

Figure 4:
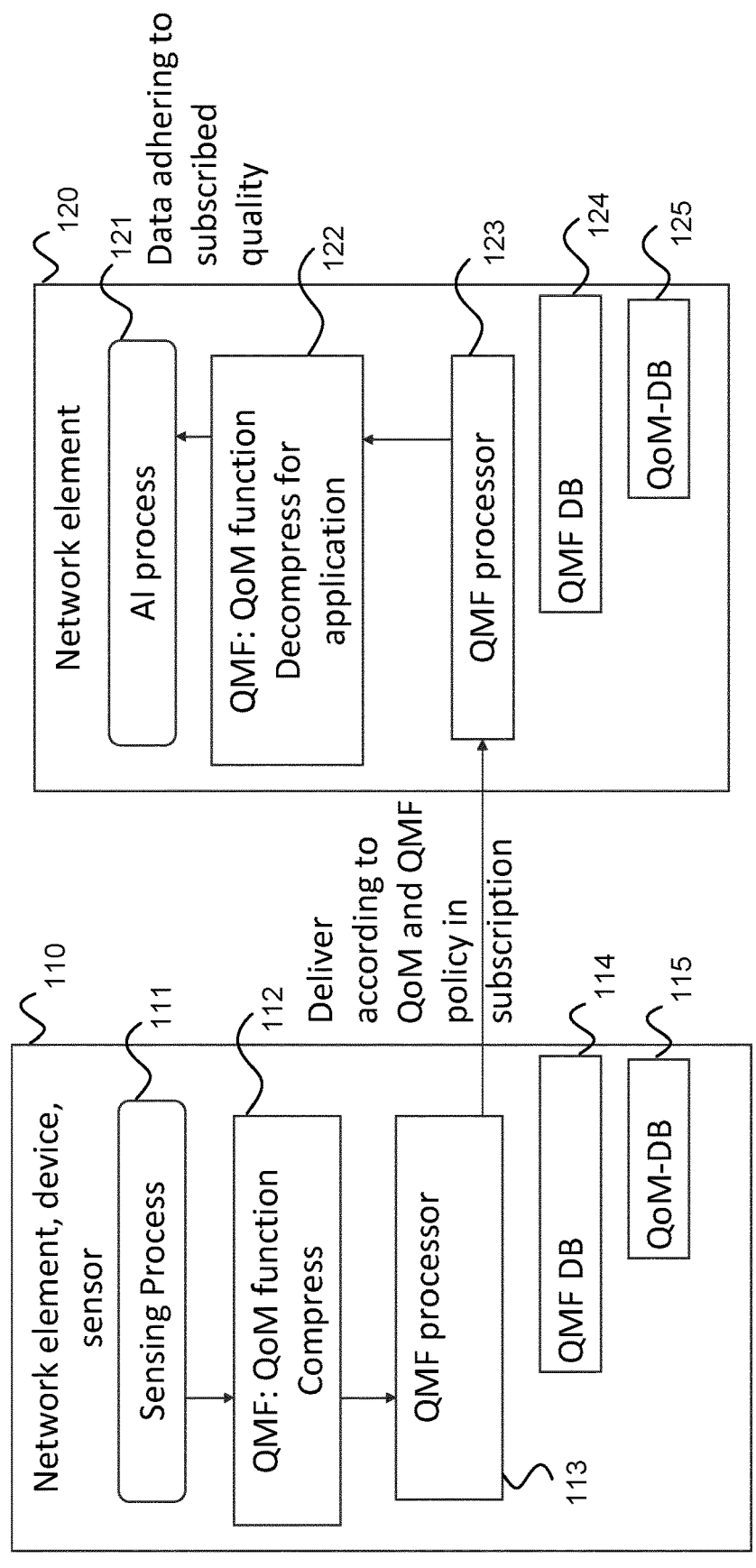
FIG. 4 shows an example embodiment of the subject matter described herein illustrating an overview of an implementation of QMF.

FIG. 4 illustrates an overview of an implementation of QMF. The sensing process 111 sends data that is processed by QMF system elements 112-115 of NE/sensor 110. The QMF system elements 112-115 can implement QoM as a function and provide semantic compression for the sensor/data stream as well as, e.g., determine a proper sampling rate. The QMF system elements 112-115 and 121-125 of NE 120 may then facilitate the distributed execution of various learning and processing tasks for the compressed data. The data delivery is optimized given the QoM and QMF specifications, and the data is transmitted and operated on in a compressed form.

At least some example embodiments may define the QMF as a task specific code fragment (that may be, e.g., stateless or use local state through database primitives) for aggregating and pre-processing observed data in order to make not only transmission but also learning and prediction more efficient. Building on the semantic compression of QoM, an application defined function is able to further operate on the incoming data for application specific semantics.

The QMF may include, e.g., a 'send QMF (function) update' part, a 'receive QMF (function) update/remove function' part, and/or a 'reference to application-controlled data for state updates' part.

Examples of the code fragments may include trigger conditions for learning, trigger conditions for general actions (including implementing QoM semantic compression), data normalization and summarization close to the source (such as succinct statistics), and machine learning (such as Bayesian learning, federated learning i.e. emit local models accumulated so far). For example, the QMF may implement this summarization which is close to the source. The QMFs may be aggregated through the RP mechanism enabling summarization of multiple QMFs in the neighborhood. The QMF allows performance/sensing data operations in the sensor or close to the sensor, and thus all of the operations may be executable locally in at least some embodiments. Accordingly, the QMF pushes the sensing data processing very close to the sensor and device in at least some embodiments, thereby allowing significant benefits.

Implementing federated learning as a QMF may provide a unified framework for various kinds of distributed processing and learning.

At least some of the example embodiments described herein may allow distributed management and execution of learning and data processing tasks. Furthermore, at least some of the example embodiments described herein may allow seamless integration of data processing, compression, and learning at the sensor, device, edge and server.

Figure 5:
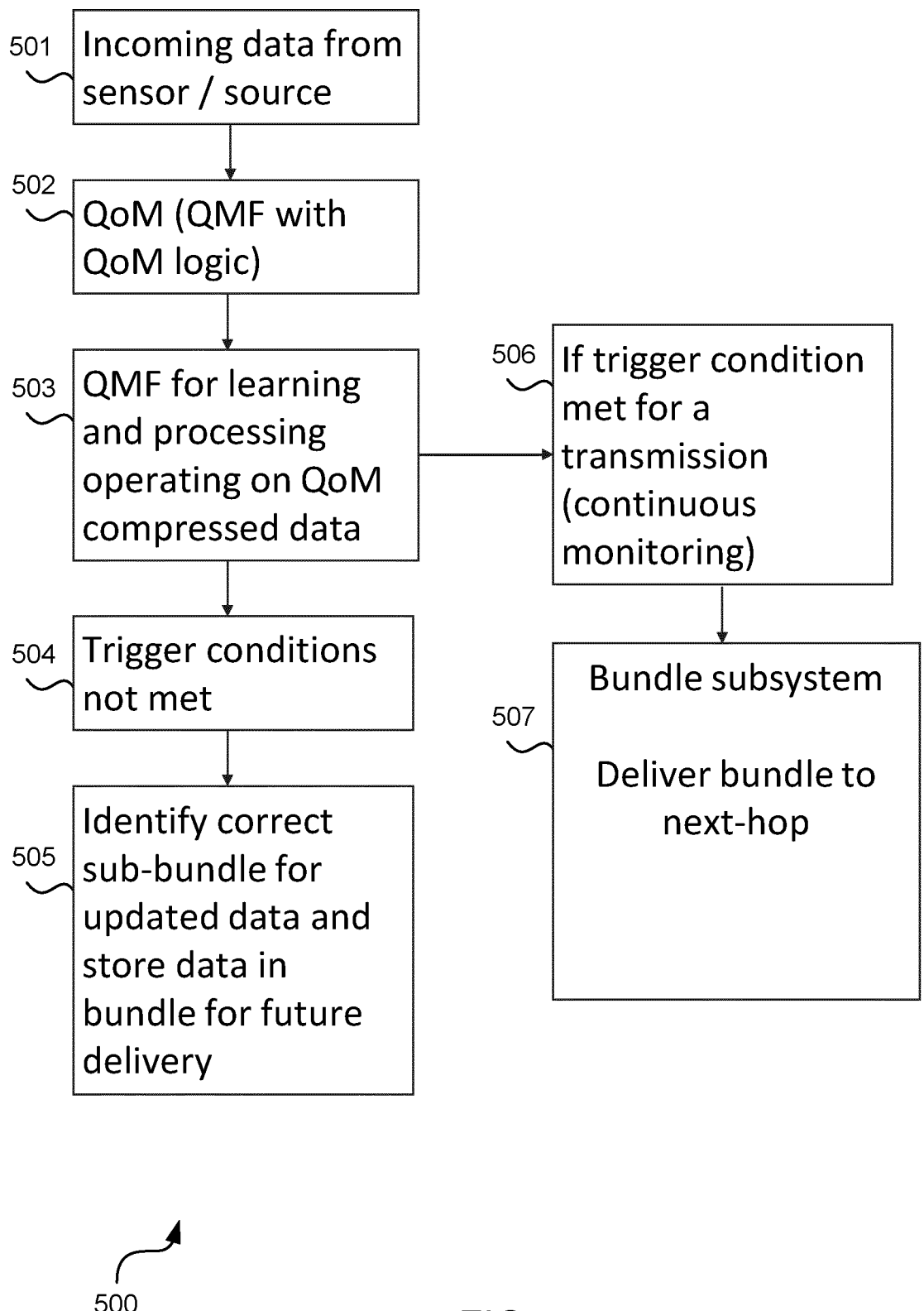
FIG. 5 shows an example embodiment of the subject matter described herein illustrating a bundle process.

FIG. 5 shows an example embodiment of the subject matter described herein illustrating a bundle process. At least some of the example embodiments described herein may utilize QMF bundling for the optimization of data transmission and caching. Herein, the term "bundle" refers to a data structure that may be sent in a message.

At least some of the example embodiments provide advanced aggregation of sensed and learned data through semantic data bundling operations. At least some of the example embodiments allow intelligent aggregation at the sensor and in the network. The described bundle mechanism enables operations on the compressed form and caching for efficiency, handover optimization and fault-tolerance.

Operations supported by the described bundle mechanism may include cache bundle, compress to bundle, and/or expand bundle data/sample bundle data.

In other words, at least some of the example embodiments may define three operations for the bundle: collapsing time-series data into the bundle, combining two or more bundles, and expanding the bundle into a representation of the original time series data. The merged bundle has a lookup structure in which the merged time-series data can be found. Benefits may include: data is sent when necessary optimizing transmission, bundle captures the data in a form that can be compressed and semantics are considered, bundles can be cached at intermediate servers and state can be restored from bundles (thus the system supports efficient access to data and allows new modes of operation with the data, such as information-centric networking), and algorithms can operate on the bundles that are compressed with semantic compression (memory needs for algorithms are decreased).

Diagram 500 of FIG. 5 gives an overview of the bundle process. The sensor data 501 is first processed by the relevant QMF functions: sensing, learning, and semantic compression, 502-503. If the trigger conditions indicated by any of the QMFs are met, 506, the current data gathered into a bundle is transmitted in a message, 507. If the trigger threshold conditions are not met, 504, the current bundle data structure is updated with the latest data based on semantic compression and bundle data type specific rules, 505. The bundle trigger rules are continuously monitored by the bundle framework.

Figure 6:
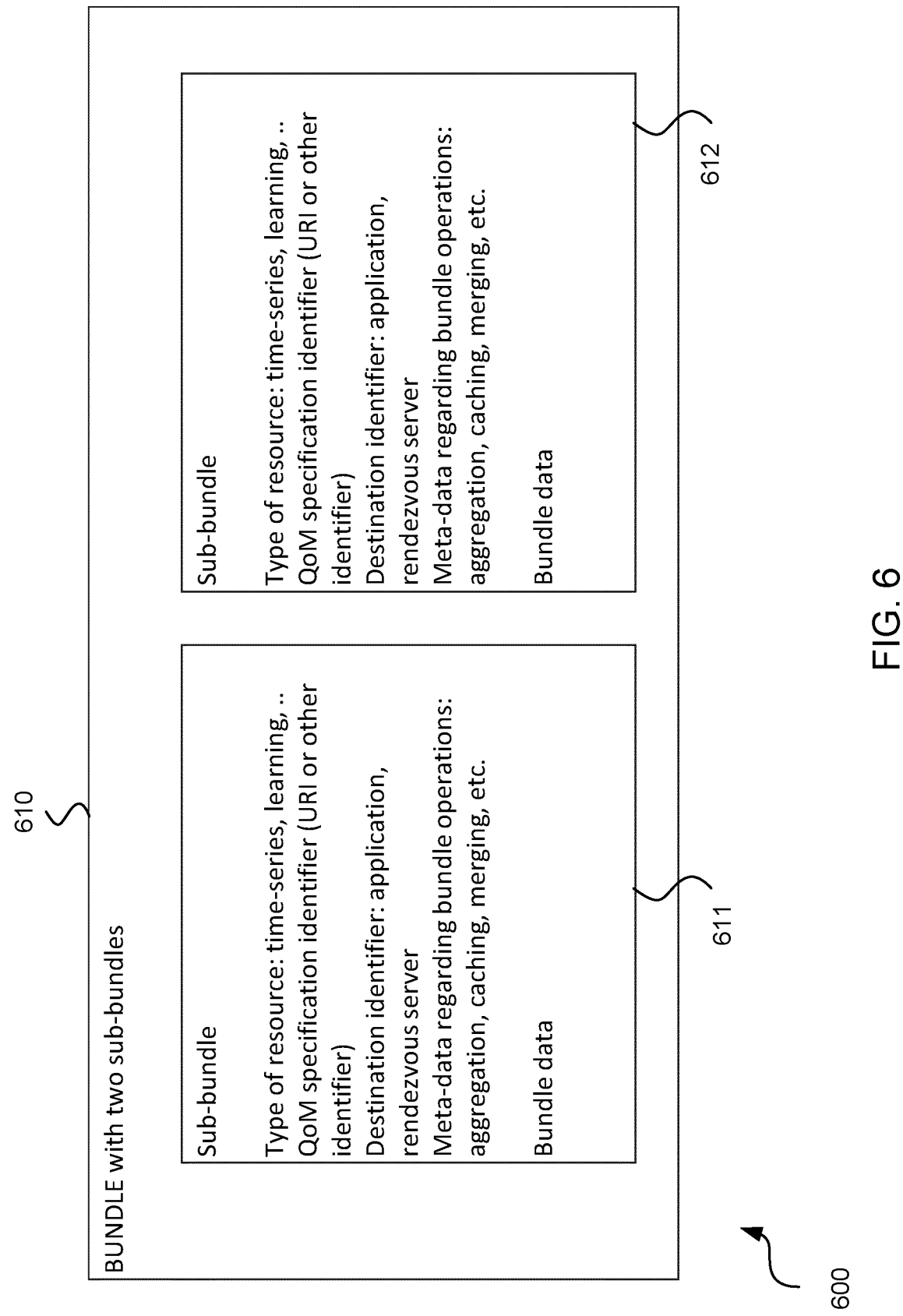
FIG. 6 shows an example embodiment of the subject matter described herein illustrating an example of a bundle format.

FIG. 6 shows an example embodiment of the subject matter described herein illustrating an example of a bundle format. That is, diagram 600 of FIG. 6 illustrates the bundle data structure 610 that accommodates sub-bundle structures 611, 612. The bundle data structure 610 stores the semantically compressed data for the QMFs and can answer queries to this data and expand the data to approximate the original data distribution (subject to the QMF accuracy). The bundle data format allows bundle aggregation and splitting. It is to be understood that the bundle data structure, the sub-bundle structures and the included data shown in FIG. 6 are examples only. For example, some of the included data shown in FIG. 6 may be excluded in other example embodiments and/or other example embodiments may include data not shown in FIG. 6, in at least some of the sub-bundle structures.

Figure 7:
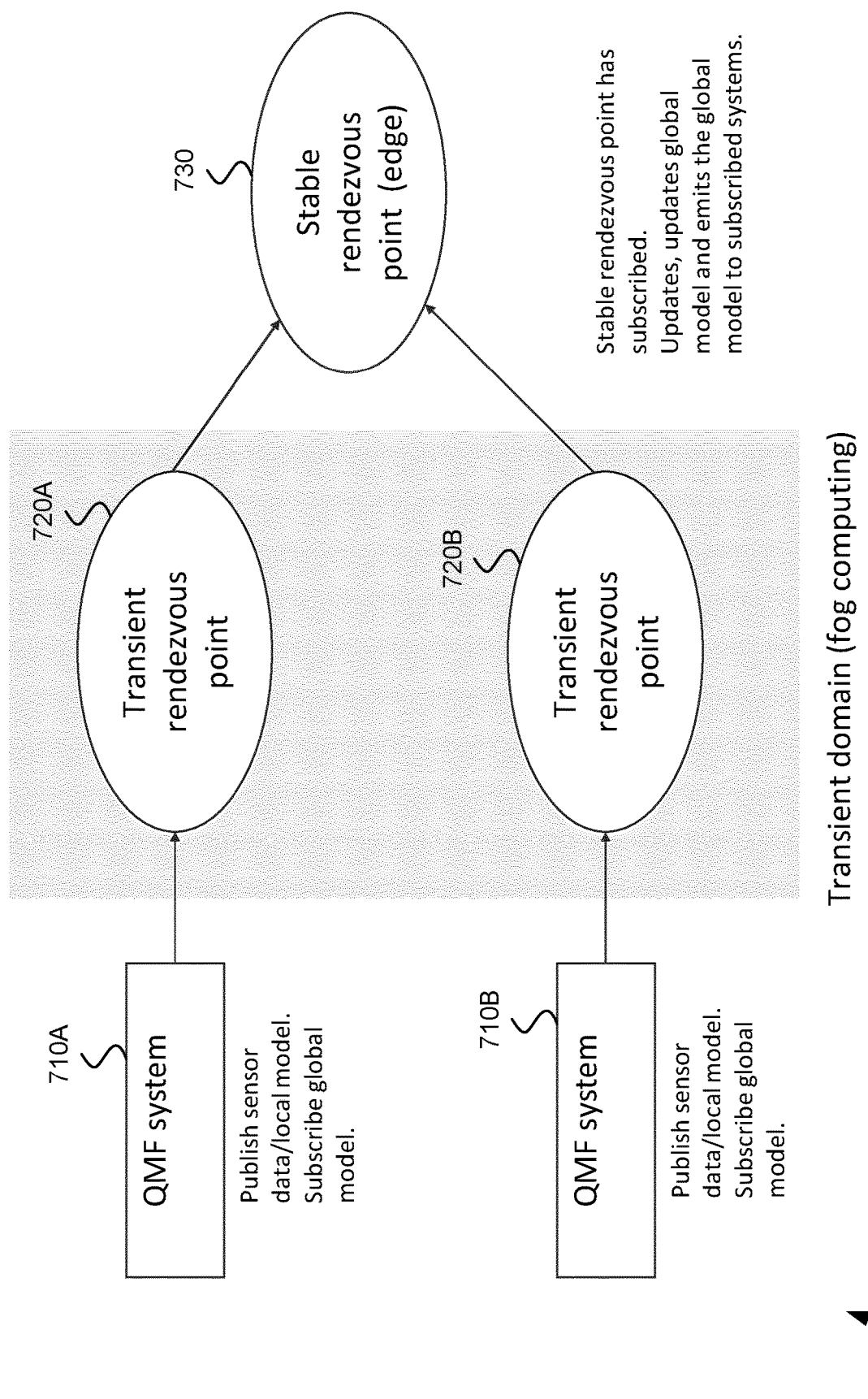
FIG. 7 shows an example embodiment of the subject matter described herein illustrating rendezvous learning with QMF.

FIG. 7 shows an example embodiment of the subject matter described herein illustrating QMF mesh networking and rendezvous learning with QMF. At least some of the embodiments described herein may utilize QMF mesh networking for distributed compression of monitoring logic over devices.

At least some of the example embodiments allow a distributed rendezvous point based mechanism for sensing, data processing, and learning that is suitable for fog/edge computing environment, for example. At least some of the example embodiments utilize the quality of monitoring policies, functions for learning and processing, and transient and designated rendezvous points in the network for data/model aggregation.

As an example, a federated learning algorithm may begin by initializing a global model at a server and then distribute this global model to a set of devices (which may be a sample of a larger population). Each of these devices may accumulate data and train a local model based on the data. The local model and its updated versions may be sent to the server where they are aggregated by the federated averaging algorithm. The server may then distribute the global model to the devices. The algorithm may then continue with this iterative algorithm. The federated learning model works with parametric models. Suitable machine learning algorithms include e.g. linear and logistic regression, neural networks, and support vector machines.

The federated learning model may be implemented with the QMF framework. The local sensing and model building may be realized as a QMF. The bundle extension may be used to enable the semantic compression of the model. The mesh networking part may be used to enable the distributed processing of the locally built models through processing at rendezvous points. The designed rendezvous point may be responsible for generating a new combined model. However, model combination can be performed by transient rendezvous points as well. Thus, at least some of the example embodiments allow the combination of sensing, learning and opportunistic fog/edge processing.

Diagram 700 of FIG. 7 illustrates how the QMF systems 710A, 710B publish and subscribe data with QoM specifications. The systems 710A, 710B accommodate learning related QMFs that propagate data and learned models toward the stable rendezvous point 730 (via transient rendezvous points 720A, 720B) for the creation of the global model. The global model and its update are distributed to the subscribing nodes.

Figure 2:
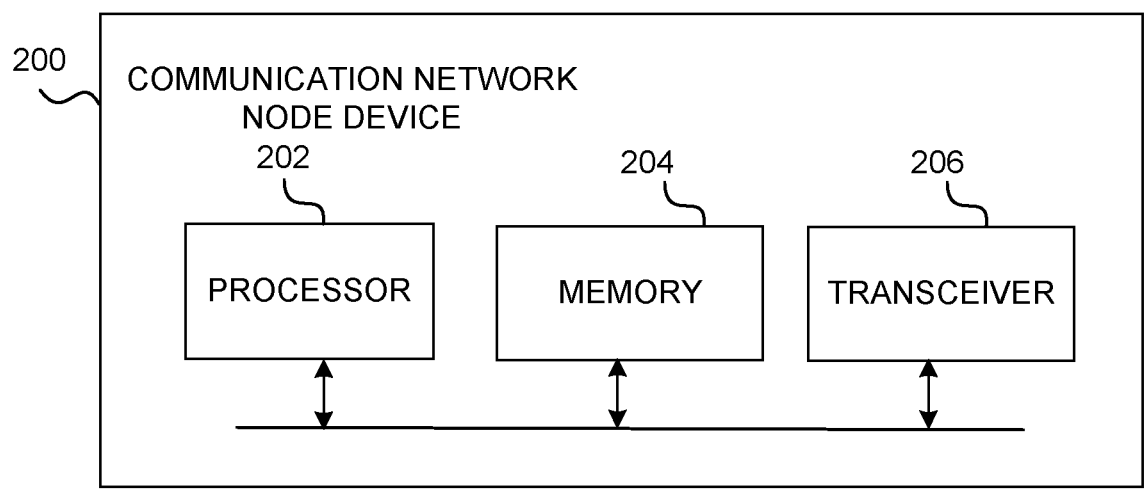
FIG. 2 shows an example embodiment of the subject matter described herein illustrating a communication network node device.

FIG. 2 is a block diagram of a communication network node device 200 of the communication network 100, in accordance with an example embodiment. The communication network node device 200 may comprise or be included in the sensor node 110A, 110B configured to provide sensor data, the network element 120A, 120B configured to obtain management plane performance data based on the provided sensor data, and/or the management element 130A, 130B, 130C configured to receive the obtained management plane performance data.

The communication network node device 200 comprises one or more processors 202, and one or more memories 204 that comprise computer program code. The network node device 200 may also include a transceiver 206, as well as other elements not shown in FIG. 2.

Although the communication network node device 200 is depicted to include only one processor 202, the communication network node device 200 may include more processors. In an example embodiment, the memory 204 is capable of storing instructions, such as an operating system and/or various applications.

Furthermore, the processor 202 is capable of executing the stored instructions. In an example embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 202 may be configured to execute hard-coded functionality. In an example embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The at least one memory 204 and the computer program code are configured to, with the at least one processor 202, cause the communication network node device 200 to at least perform setting up a quality of monitoring function, QMF, for managing at least one quality of monitoring, QoM, model. The at least one QoM model defines QoM classes for processing and compressing a performance and/or sensing data stream via selection of data to be included in the performance and/or sensing data stream. The performance and/or sensing data stream comprises performance measurement results based on sensor data provided by one or more sensor nodes 110A, 110B in the communication network 100. In an example embodiment, the performance and/or sensing data stream may comprise a management plane performance data stream. Alternatively or additionally, the performance and/or sensing data stream may comprise other sensor data than management plane data, for example, in a smart city use case a QMF may be used for a smart street light, or a pollution sensor or some other smart city sensor.

The at least one memory 204 and the computer program code are further configured to, with the at least one processor 202, cause the communication network node device 200 to at least perform causing a first message notifying about the set up QMF to be transmitted (e.g. using the transceiver 206) towards at least one first target rendezvous point, RP, in the communication network 100. Each RP is configured to aggregate performance and/or sensing data streams and/or QoM models.

In an example embodiment, the first target RP may be a designated RP. The set up QMF may be transmitted towards the at least one designated RP via at least one transient RP. Furthermore, the set up QMF may be transmitted towards the at least one first target RP via a mobility protocol.

In an example embodiment, the set up QMF may be configured to publish at least one of sensor data or a local QoM model. Alternatively or additionally, the set up QMF may be configured to subscribe a global QoM model.

The at least one memory 204 and the computer program code may optionally be further configured to, with the at least one processor 202, cause the communication network node device 200 to perform receiving a first completion token from the at least one first target RP indicating a successful receipt and processing of the first message. In an example embodiment, the first completion token may be aggregated.

In response to the communication network node device 200 being relocated in the communication network 100, the at least one memory 204 and the computer program code may optionally be further configured to, with the at least one processor 202, cause the communication network node device 200 to perform causing a second message notifying about the set up QMF to be transmitted towards at least one second target RP in the communication network 100. The at least one memory 204 and the computer program code may optionally be further configured to, with the at least one processor 202, cause the communication network node device 200 to perform receiving a second completion token from the at least one second target RP indicating a successful receipt and processing of the second message. In an example embodiment, the second completion token may be aggregated.

At least some of the embodiments described herein allow setting up a new QMF. That is, each QMF is resolved to a designated rendezvous point. For each such rendezvous point, the system may carry out a test to ensure that the path to the rendezvous point is up-to-date (i.e., complete). Transient rendezvous points may help in the propagation of this information. The nodes may support by aggregating information. The QMF supports distributed data processing and learning. The QMF functions may define the tasks and/or the data quality/production requirements. The designated rendezvous points may support the subscribers of the information, and they may run additional functions over the data.

In the above-described handover mechanism, if two servers are subscribing the same QoM specifications, the handover of a subscriber may be done directly. The caching of bundles may allow fast reconstruction of past data.

As illustrated in tables 1 and 2 below, the style of handover may affect the buffering and signaling requirements, as the handover may involve a new connection with a simultaneous old connection, a new connection without an old connection, or a transfer of a connection to a new point of attachment.

TABLE 1

Subscriber/publisher handover without bundle optimization.

| | Subscriber | Publisher |
| --- | --- | --- |
| New connection with simultaneous old connection. Connection is a set of QMFs. | New connection is activated (complete) and then old one is deactivated. No publication can get lost | Can publish directly at new location: publication taken to designated rendezvous and toward subscribers. Duplicates are removed based on known techniques. |
| New connection without immediate connectivity to old site. Connection is a set of QMFs. | New connection is activated (complete) and then old one is deactivated through signaling. Lost data is obtained through the aggregated bundles according to the QMF. | Can publish directly at new location: publication taken to designated rendezvous and toward subscribers. Duplicates are removed based on known techniques. |
| Transfer of connection to a new point of attachment. Connection is | A special QMF setup message is sent from the designated rendezvous points | Can publish directly at new location: publication taken to designated rendezvous and toward subscribers. Duplicates |

TABLE 1-continued

Subscriber/publisher handover without bundle optimization.

| | Subscriber | Publisher |
|---|---|---|
| a set of QMFs. | towards the new point of connection. Once the new point receives a completion message from all designated rendezvous points, the old connection can be deactivated. | are removed based on known techniques. |

TABLE 2

Subscriber/publisher handover with bundle optimization.

| | Subscriber | Publisher |
|---|---|---|
| New connection with simultaneous old connection. Connection is a set of QMFs. | Old connection can be deactivated immediately. New connection is activated (complete to designated rendezvous). The delivered bundles will contain the data also published during the handover. | Can publish directly at new location: publication taken to designated rendezvous and toward subscribers. Duplicates are removed based on known techniques. |
| New connection without immediate connectivity to old site. Connection is a set of QMFs. | Old connection can be deactivated immediately. New connection is activated (complete to designated rendezvous). The delivered bundles will contain the data also published during the handover. | Can publish directly at new location: publication taken to designated rendezvous and toward subscribers. Duplicates are removed based on known techniques. |
| Transfer of connection to a new point of attachment. Connection is a set of QMFs. | The connection is deactivated towards the old subscriber. The old subscription can be deactivated immediately. New subscriber is activated (complete to designated rendezvous). The delivered bundles will contain the data also published during the relocation. | Can publish directly at new location: publication taken to designated rendezvous and toward subscribers. Duplicates are removed based on known techniques. |

In the above tables 1 and 2, the phrase "connection is a set of QMFs" refers to a feature of QMFs (subscriptions) being able to create a logical connection through which updates are sent. This connection may change when the device running the QMF changes the network access point and neighborhood.

The bundle optimization relates to the intelligent storing of QMF data into the bundle format (a data structure that may then be sent in a message, as described earlier). The bundle (data structure) can then be stored by processing nodes and servers. More specifically, the optimization relates to aggregating data in bundles and combining bundles within the processing nodes. This results in the information needed for a handover and its completion being available on nearby processing nodes, thus reducing signaling and processing.

Figure 3:
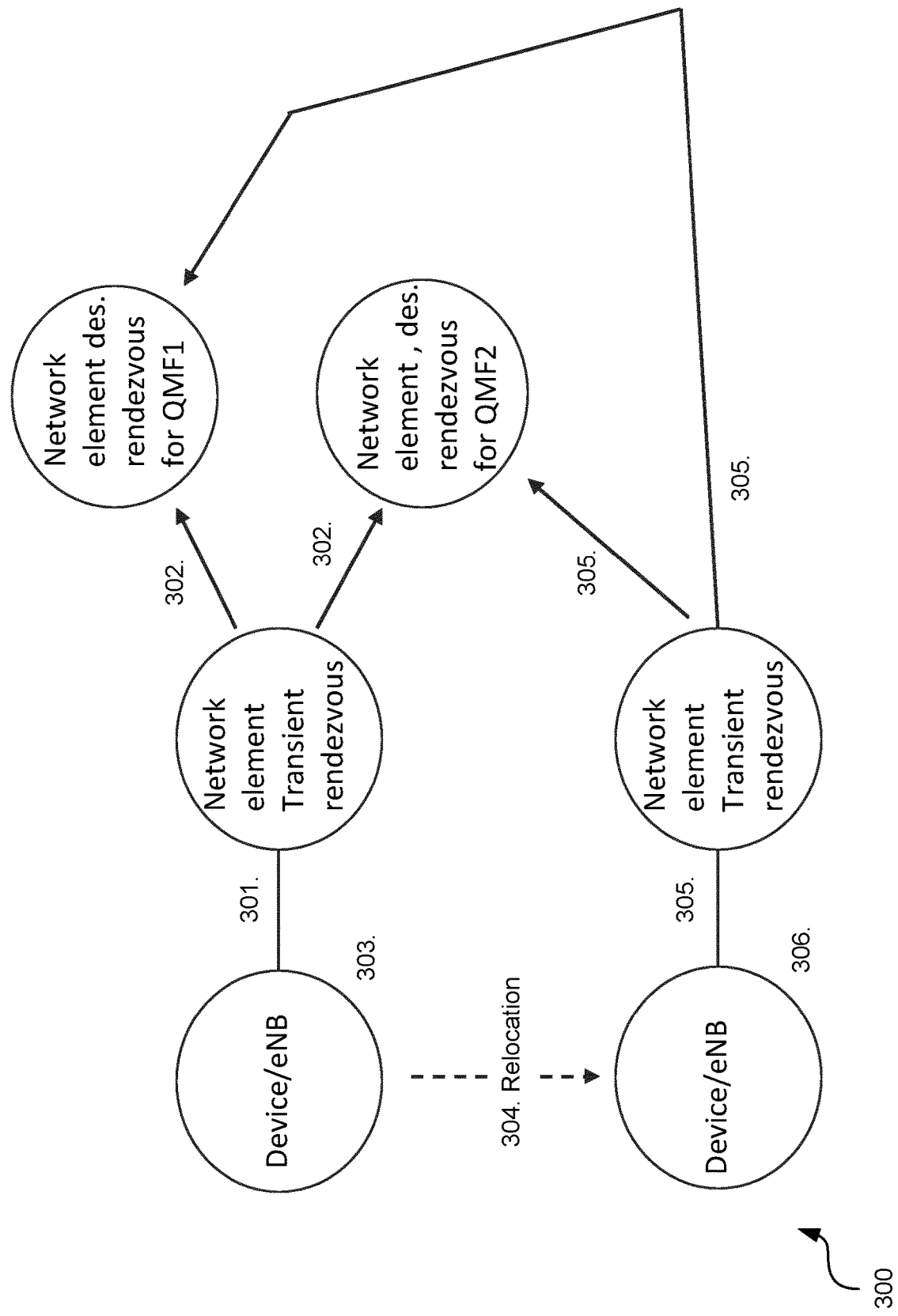
FIG. 3 shows an example embodiment of the subject matter described herein illustrating a method.

FIG. 3 illustrates an example diagram of a method 300, in accordance with an example embodiment.

At operation 301, the communication network node device 200 of the communication network 100, sets up a quality of monitoring function, QMF, for managing at least one quality of monitoring, QoM, model. The at least one QoM model defines QoM classes for processing and compressing a performance and/or sensing data stream via selection of data to be included in the performance and/or sensing data stream. The performance and/or sensing data stream comprises performance measurement results based on sensor data provided by one or more sensor nodes 110A, 110B in the communication network 100.

At operation 302, the communication network node device 200 causes a first message notifying about the set up QMF to be transmitted towards at least one first target rendezvous point, RP, in the communication network 100. Each RP is configured to aggregate performance and/or sensing data streams and/or QoM models.

At optional operation 303, the communication network node device 200 may receive a first completion token from the at least one first target RP indicating a successful receipt and processing of the first message.

At optional operation 304, the communication network node device 200 may be relocated. In response, at optional operation 305, the communication network node device 200 may cause a second message notifying about the set up QMF to be transmitted towards at least one second target RP in the communication network.

At optional operation 306, the communication network node device 200 may receive a second completion token from the at least one second target RP indicating a successful receipt and processing of the second message.

The method 300 may be performed by the communication network node device 200 of FIG. 2. Further features of the method 300 directly result from the functionalities and parameters of the communication network node device 200, and thus are not repeated here. The method 300 can be performed by computer program(s).

The functionality described herein can be performed, at least in part, by one or more computer program product components such as software components. According to an embodiment, the communication network node device 200 comprises a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A communication network node device of a communication network, comprising:
   at least one processor; and
   at least one memory including computer program code;
   the at least one memory and the computer program code configured to, with the at least one processor, cause the communication network node device to at least perform:
   setting up a quality of monitoring function, QMF, for managing at least one quality of monitoring, QoM, model, the at least one QoM model defining QoM classes for processing and compressing a performance and/or sensing data stream via selection of data to be included in the performance and/or sensing data stream, the performance and/or sensing data stream comprising performance measurement results based on sensor data provided by one or more sensor nodes in the communication network;
   causing a first message notifying about the set up QMF to be transmitted towards at least one first target rendezvous point, RP, in the communication network (100), each RP being configured to aggregate at least one of performance and/or sensing data streams or QoM models, and
   receiving a first completion token from the at least one first target RP indicating a successful receipt and processing of the first message.

2. The communication network node device according to claim 1, wherein the set up QMF is configured to publish at least one of sensor data or a local QoM model.

3. The communication network node device according to claim 1, wherein the set up QMF is configured to subscribe a global QoM model.

4. The communication network node device according to claim 1 wherein the first target RP is a designated RP.

5. The communication network node device according to claim 4, wherein the set up QMF is transmitted towards the at least one designated RP via at least one transient RP.

6. The communication network node device according to claim 1, wherein the set up QMF is transmitted towards the at least one first target RP via a mobility protocol.

7. The communication network node device according to claim 1, wherein the at least one memory and the computer program code are further configured to, with the at least one processor, cause the communication network node device to at least perform:
   in response to the communication network node device being relocated in the communication network, causing a second message notifying about the set up QMF to be transmitted towards at least one second target RP in the communication network.

8. The communication network node device according to claim 1, wherein the communication network node device comprises one of a sensor node configured to provide sensor data, a network element configured to obtain performance and/or sensing data based on the provided sensor data, or a management element configured to receive the obtained performance and/or sensing data.

9. The communication network node device according to claim 1, wherein the performance and/or sensing data stream comprises a management plane performance data stream.

10. A method, comprising:
    setting up, by a communication network node device of a communication network, a quality of monitoring function, QMF, for managing at least one quality of monitoring, QoM, model, the at least one QoM model defining QoM classes for processing and compressing a performance and/or sensing data stream via selection of data to be included in the performance and/or sensing data stream, the performance and/or sensing data stream comprising performance measurement results based on sensor data provided by one or more sensor nodes in the communication network;
    causing, by the communication network node device, a first message notifying about the set up QMF to be transmitted towards at least one first target rendezvous point, RP, in the communication network, each RP being configured to aggregate at least one of performance and/or sensing data streams or QoM models, and
    receiving a first completion token from the at least one first target RP indicating a successful receipt and processing of the first message.

11. A non-transitory computer-readable medium comprising program code configured to perform the method according to claim 10, when the computer program code is executed on a computer.

* * * * *